(12) United States Patent
Lin

(10) Patent No.: US 6,498,566 B1
(45) Date of Patent: Dec. 24, 2002

(54) METHOD FOR MEASURING FLUID LEVEL

(75) Inventor: Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 98 days.

(21) Appl. No.: 09/636,401

(22) Filed: Aug. 10, 2000

(51) Int. Cl.$^7$ ............................................... B08G 21/00
(52) U.S. Cl. ..................... 340/612; 340/618; 73/304 C; 73/54.05
(58) Field of Search ............................... 340/618, 612, 340/620; 73/53.01, 54.05, 304 R, 304 C

(56) References Cited

U.S. PATENT DOCUMENTS 3,901,079 A * 8/1975 Vogel ........................ 73/304 C
4,392,378 A * 7/1983 Pitches et al. ............. 73/304 C
4,888,989 A * 12/1989 Homer ...................... 73/304 C

* cited by examiner

Primary Examiner—Julie Lieu
(74) Attorney, Agent, or Firm—Margaret A. Dobrowitsky

(57) ABSTRACT

A method for measuring fluid level uses data sensed by an oil level sensor to determine the level of oil in a motor vehicle oil pan. The oil level sensor can include a receiver tube oriented upright in the oil pan of the vehicle. A level tube is disposed in the receiver tube and below the level tube is a reference tube. A circuit is electrically connected to the tubes for outputting a signal representative of oil level in the oil pan. As the engine oil level decreases within the level tube, the output of the sensor drops. The method includes providing a series of signals to the sensor and recording the output from the sensor with the sensor in a variety of configurations. This information is then processed to determine the ratio of measured oil in the oil pan to the proper operating oil level.

12 Claims, 2 Drawing Sheets

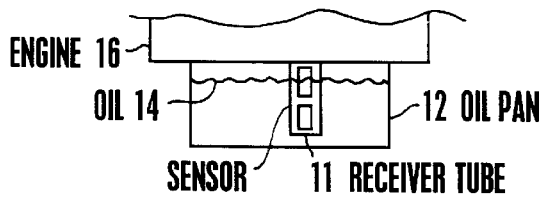
Fig. 1
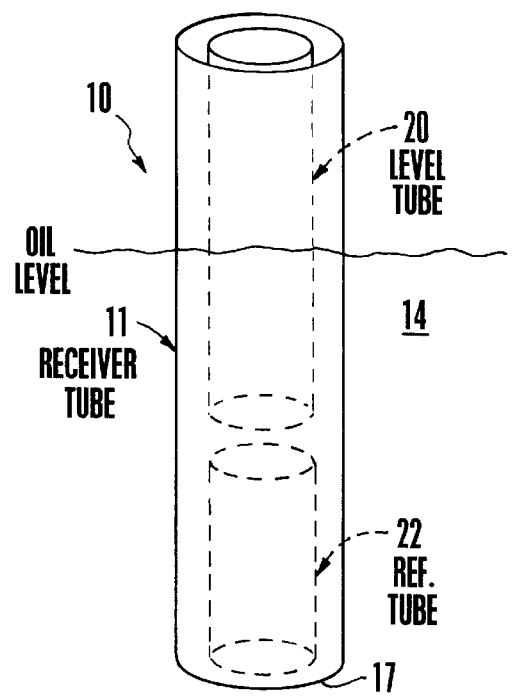
Fig. 2
Fig. 3
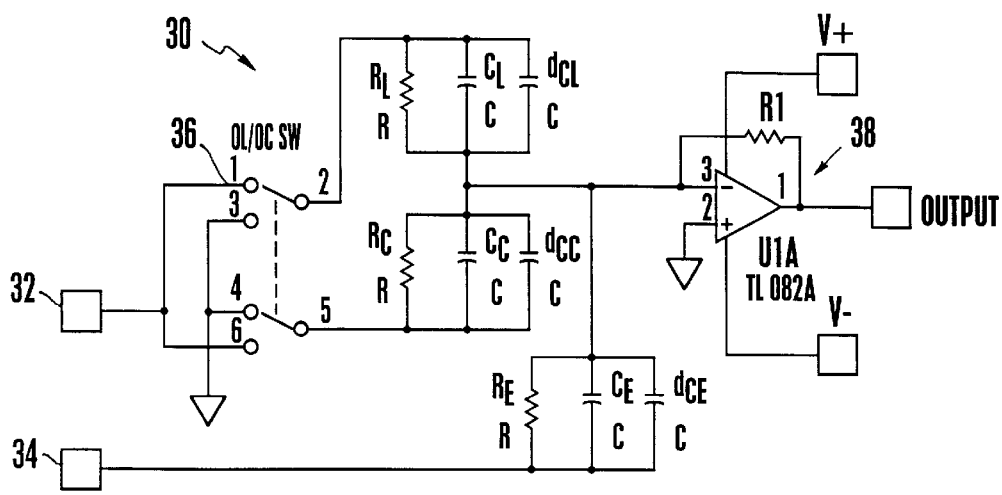

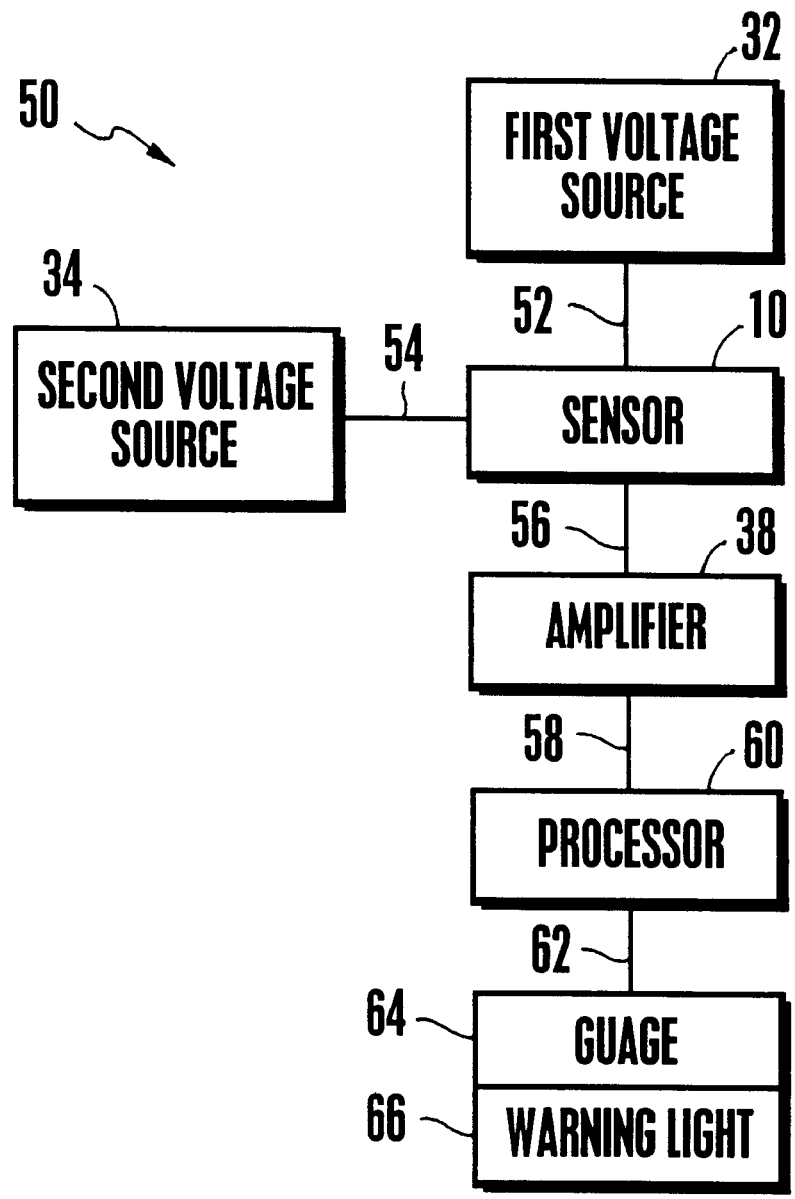

METHOD FOR MEASURING FLUID LEVEL

TECHNICAL FIELD

The present invention relates generally to systems and methods for measuring fluid levels, and more particularly to methods and structure for measuring oil level in a vehicle engine.

BACKGROUND OF THE INVENTION

Accurately measuring fluid levels is important in many applications. As but one example, automatically monitoring the quality and amount of oil in a vehicle alerts drivers in a timely fashion when maintenance should be performed as dictated by the actual condition of the vehicle. Performing maintenance when it is actually required is preferred over following a predetermined, one-size-fits-all schedule that might be too long or too short for any given vehicle, depending on the way the vehicle is driven. If too long a period elapses between maintenance, a vehicle can be damaged. On the other hand, conducting maintenance when it is not needed is wasteful both in terms of labor and in terms of natural resources. For example, if a vehicle doesn't require an oil change but nevertheless receives one, oil is in effect wasted.

Accordingly, systems have been provided for measuring various parameters of a vehicle's engine oil, and to generate warning signals when maintenance is due as indicated by the condition of the oil. Among the parameters that are typically measured are oil temperature, condition, and level, and the signals from multiple sensors can be combined to generate the final engine oil maintenance signal. Of importance to the present invention is the accurate measurement of oil level.

As understood herein, oil level depends on many factors. Electrical properties of oil are used to measure level, which has the advantage of providing a way to measure the oil level without the need for a moving part. Moreover, using the electrical properties to measure the oil level is very reliable. We have recognized, however, that the electrical properties depend on, among other things, temperature, oil brand, oil condition, and oil contamination, making it difficult to accurately measure oil level over a wide temperature range and independently of brand and condition.

The present invention understands that a reference sensor can be used along with a level sensor. The signal from the level sensor is divided by the signal from the reference sensor to cancel the effects of oil condition and so on, leaving a signal that represents level only. As recognized herein, two different oil levels may have the same output. In order to distinguish the two different oil levels, a fixed and known value capacitor, referred to herein as an on chip capacitor, is needed. If untrimmed, the on chip capacitor may have a twenty percent (plus or minus) variation around the nominal value. This variation is unacceptable for the required accuracy for oil level, which typically is plus or minus ten percent. The on chip capacitor may be trimmed to increase its accuracy. However, trimming the on chip capacitor increases the cost of the oil sensor.

Existing sensors also have very small signal strengths, and, hence, poor signal-to-noise ratios. Significant amplification of the output signal is required, and this in turn introduces noise amplification and the problems attendant thereto. Moreover, to eliminate temperature differential effects the two sensors should be positioned close together. However, placing the sensors close together normally dictates using a relatively low input signal frequency that might not be effective at low oil temperatures. The present invention has recognized these prior art drawbacks, and has provided the below-disclosed solutions to one or more of the prior art deficiencies. More specifically, the present invention can accurately determine the oil level by precalibration of the sensor without trimming the on-chip capacitor, and thus without increasing the cost of the sensor.

SUMMARY OF THE INVENTION

A method for measuring fluid level in a motor vehicle includes providing a fluid level sensor that has a receiver tube positionable in a container of fluid such that the receiver tube defines an upright orientation when installed in the container. A level tube is coaxially disposed in the receiver tube, and a reference tube is coaxially disposed in the receiver tube below the level tube relative to the upright orientation of the receiver tube. Moreover, a circuit is electrically connected to the tubes and outputs a signal representative of fluid level in the container.

The method includes determining and recording a sensor output, $V_{L/Eair}$, with the circuit in the level/empty configuration and the sensor in air, and then determining and recording a sensor output, $V_{C/Eair}$, with the circuit in the condition (reference)/empty configuration and the sensor in air. The next step is to determine and record a sensor output, $V_{L/Etest}$, with the circuit in the level/empty configuration and the sensor in a test fluid, and then to determine and record a sensor output, $V_{C/Etest}$, with the circuit in the condition (reference)/empty configuration and the sensor in the test fluid.

Following the above steps, the sensor is placed in a subject fluid, such as oil, and a sensor output, $V_{L/Eoil}$, with the circuit in the level/empty configuration, is determined and recorded. With the sensor remaining in the subject fluid and the circuit in the condition (reference)/empty configuration, a sensor output, $V_{L/Eoil}$, and the sensor in the subject fluid. Based on the sensor outputs, the level of fluid in a container is determined.

In a presently preferred embodiment of the invention discussed below, a shaped voltage signal and an inverted shaped voltage signal are input to the circuit. Moreover, a signal is provided to a gauge that continuously displays the subject fluid level. Alternatively, a signal is provided to a warning light that is illuminated when the subject fluid level falls below a predetermined level.

In another aspect of the present invention, a method for determining fluid level includes placing a sensor in a fluid. Next, a sensor circuit is configured to a level/empty configuration and at least two signals are input to the circuit. A first sensor output is received. The circuit is then configured to a condition (reference)/empty configuration, at least two signals are input to the circuit, and a second sensor output is received. Based on the first and second outputs, a signal representative of fluid level in the container is then output.

In yet another aspect of the present invention, a method for sensing fluid level includes disposing at least one level sensing structure in a container holding the fluid. The sensing structure defines at least a portion of an electrical circuit into which a waveform and inverse waveform are input.

The present invention will now be described, by way of example, with reference to the accompanying drawings, in which:

BRIEF DESCRIPTION OF THE DRAWINGS

FIG. 1 is a schematic view of the present receiver tube mounted in the engine oil pan;

FIG. 2 is a schematic view of the level tube and reference tube disposed in the receiver tube;

FIG. 3 is a schematic diagram of the ideal electrical circuit used to sense impedance ratios in the first configuration; and FIG. 4 is a block diagram of the oil sensing system.

DESCRIPTION OF AN EMBODIMENT OF THE INVENTION

Referring initially to FIG. 1, an oil level sensor 10 is shown mounted in an upright position in an oil pan 12. Liquid such as oil 14 of the engine 16 enters into the interior of the sensor 10 by any means, such as, e.g., through the open bottom end 17 of the receiver tube 11, described below, or a hole (not shown) that is formed near the bottom end 17 of the tube 11. It is to be understood that the present invention can be used in a wide range of other applications that require measuring fluid level.

Now referring to FIG. 2, the sensor 10 includes a receiver tube 11 that is a hollow cylindrical tube fabricated out of conductive material. A level tube 20 and a reference tube 22, both fabricated from conductive material, are disposed in the receiver tube 10 coaxially with each other and with the receiver tube 10 coaxially with each other and with the receiver tube 10. As shown, the reference tube 22 is coaxially disposed in the receiver tube 10 below the level tube 20 relative to the upright position.

In accordance with the present invention, the level tube 20 and the receiver tube 10 together establish a first impedance value and the reference tube 22 and the receiver tube 10 together establish a second impedance value. The impedance can be modeled as a capacitor in parallel with a resistor. The impedances depend on the geometry of the tubes, the relative position of the tubes, and the physical properties of intermedium materials filled between the tubes. In one preferred embodiment, the intermedium material is oil; however the present invention is not limited to oil, but could use any appropriate liquid. As the skilled artisan will appreciate, the impedance is further dependent on the dielectric coefficient and conductivity of the liquid.

Referring now to FIG. 3, an electrical circuit, generally designated 30, is shown that includes an input signal generator that includes a first voltage source 32 and a second voltage source 34. In a preferred embodiment the first voltage source 32 provides a triangular voltage and the second voltage source 34 provides an inverted triangular voltage, although other waveforms can be used.

In a first configuration of the circuit 30 designated the level/empty configuration, an oil level tube capacitor $C_L$ is arranged in parallel with an additional oil level tube capacitor $dC_L$, and an oil level tube resistor $R_L$. These three components are established by the cooperation of structure between the receiver tube 11 and level tube 20, and they are connected to three other co-parallel components, namely an empty check capacitor $C_E$, an additional empty check capacitor $dC_E$, and an empty check resistor $R_E$. In a second configuration of the circuit 30 designated the condition (reference)/empty configuration, an oil condition (reference) tube capacitor $C_C$, an additional oil condition (reference) tube capacitor $dC_C$, and an oil condition (reference) tube resistor $R_C$, established by the cooperation of structure between the reference tube 22 and the receiver tube 11, are connected to the empty check capacitors $C_E$, $dC_E$ and the empty check resistor $R_E$. As shown in FIG. 3, an analog switch 36 is used to toggle between the first configuration and the second configuration.

Continuing the description of FIG. 3, in order to select the first configuration, i.e., the level/empty configuration, the analog switch 36 is moved to terminals "1" and "4" to complete the circuit from the first voltage source 32 through the oil level tube capacitors $C_L$, $dC_L$ and the oil level tube resistor $R_L$. In the first configuration, the analog switch 32 connects the oil condition (reference) tube capacitors $C_R$, $dC_R$ and the oil condition (reference) tube resistor $R_C$ to ground as shown. The second voltage source 34 provides a voltage signal to the empty check capacitors $C_E$, $dC_E$ and the empty check resistor $R_E$. The oil level tube capacitors $C_L$, $dC_L$, oil level tube resistor $R_L$, empty check capacitors $C_E$, $dC_E$ and empty check resistor $R_E$ are connected to the input of an amplifier circuit 38 which provides the final output of the circuit 30. In this first configuration, each path of the of the above-described circuit establishes a signal level and a phase shift of the signals provided by the voltage sources 32, 34. These signal levels and phase shifts are summed together at the input of the amplifier circuit 38.

To select the second configuration, i.e., the condition (reference)/empty configuration, the analog switch 116 is moved to terminals "3" and "6" to complete the path from the first voltage source 32 through the oil condition (reference) tube capacitors $C_C$, $dC_C$ and oil condition (reference) tube resistor $R_C$ to the input of the amplifier circuit 38. As before, the second voltage source 34 provides a voltage signal to the empty check capacitors $C_E$, $dC_E$ and the empty check resistor $R_E$. The oil condition (reference) tube capacitors $C_C$, $dC_C$, oil condition (reference) tube resistor $R_C$, empty check capacitors $C_E$, $dC_E$ and empty check resistor $R_E$ are connected to the input of an amplifier circuit 38 which provides the final output of the circuit 30. In this second configuration, the analog switch 36 connects the level tube capacitors $C_L$, $dC_L$ and the level tube resistor $R_L$ to ground.

The receiver tube 10, level tube 20, and reference tube 22 may be employed in the method set forth below to determine the oil level in the vehicle by using the equation below with reference made to the circuit shown in FIG. 3:

$$b = \frac{(V_{L/Eoil} - V_{L/Eair})(V_{C/Etest} - V_{C/Eair})}{(V_{C/Eoil} - V_{C/Eair})(V_{L/Etest} - V_{L/Eair})}$$

Where:
b=Ratio of measured oil to the full oil level $V_{L/Eair}$=Sensor output with level/empty configuration in air (V)

$V_{C/Eair}$=Sensor output with condition (reference)/empty configuration in air (V)

$V_{L/Etest}$=Sensor output with level/empty configuration in test fluid (V)

$V_{C/Etest}$=Sensor output with condition (reference)/empty configuration in test fluid (V)

$V_{L/Eoil}$=Sensor output with level/empty configuration in oil (V)

$V_{C/Eoil}$=Sensor output with condition (reference)/empty configuration in oil (V)

In order to determine the level of the motor oil 14 in the oil pan, based on the equations given above with reference to FIG. 3, the sensor 10 is first calibrated. The sensor 10 is calibrated by first placing the sensor 10 in air and establishing the first configuration, i.e., the level/empty configuration. Signals from the first and second voltage sources 32, 34 are then provided to the sensor 10 and the sensor output, $V_{L/Eair}$, is then received by the processor 60 and recorded. The second configuration, i.e., the condition (reference)/empty configuration, is then established and the signals are again input to the sensor 10. The sensor 10 output, $V_{C/Eair}$, is received and recorded by the processor 60.

The second step of calibrating the sensor 10 is to place the sensor 10 in a test fluid and the above steps are repeated, i.e., the first configuration is established and a signal is input to the sensor 10. The sensor output, $V_{L/Etest}$, is received and recorded by the processor 60. The second configuration is then established and, again, a signal is input to the sensor 10. The sensor output, $V_{C/Etest}$, is then received and recorded by the processor 60. The above-mentioned four records, $V_{L/Eair}$, $V_{C/Eair}$, $V_{L/Etest}$, and $V_{C/Etest}$, are the calibration data of the sensor 10. It is to be appreciated that in lieu of placing the sensor 10 in air to complete the first sensor calibration step, the sensor 10 may be placed in a different test fluid, i.e., a test fluid having different electrical properties than the test fluid in which the sensor 10 is placed during the second calibration step.

After the sensor 10 is calibrated following the above steps, the level of the oil 14 in the oil pan 12 may then be determined by first positioning the sensor 10 within the oil pan, e.g., as shown in FIG. 1. Once the sensor 10 is properly in place, the circuit 30 is configured to the first configuration and the signals are input to the sensor 10. The sensor output, $V_{L/Eoil}$, is then received and recorded by the processor 60. The circuit 30 is then configured to the second configuration and, again, the signals are input to the sensor 10. The sensor output, $V_{C/Eoil}$, is then received and recorded by the processor 60.

The calibration sensor outputs, $V_{L/Eair}$, $V_{C/Eair}$, $V_{L/Etest}$ and $V_{C/Etest}$, and the oil level measurement outputs, $V_{L/Eoil}$ and $V_{C/Eoil}$, are then input into the formula for b, given above, to determine the oil level in the oil pan.

Referring now to FIG. 4, a block diagram representing the present system utilized by the present method is shown and generally designated 50. The first voltage source 32 and second voltage source 34 are connected to the sensor 10. The first voltage source 32 provides a preferably triangular voltage signal 52 to the sensor 10, the second voltage source 34 provides a preferably inverted triangular signal 54 to the sensor 10, and a transformed signal 56 output by the sensor 10 is input into the amplifier 38. Accordingly, an amplified signal 58 from the amplifier 38 is then recorded and/or processed by a processor 60 in order to determine the fluid level in the vehicle in accordance with the method above. The processor 60 can then provide a processed signal 62 to a gauge 64 that shows the fluid level continuously or to a warning light 66 that is illuminated when a critical fluid level is reached.

While the particular METHOD FOR MEASURING FLUID LEVEL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. β112, sixth paragraph, unless the element is expressly recited using the phrase "means for".

What is claimed is:

1. A method for measuring fluid level in a motor vehicle comprising the acts of:

providing a fluid level sensor comprising:
a receiver tube positionable in a container of fluid, the receiver tube defining an upright orientation when installed in the container;
a level tube coaxially disposed in the receiver tube;
a reference tube coaxially disposed in the receiver tube below the level tube relative to the upright orientation; and
a circuit electrically connected to the tubes for outputting a signal representative of fluid level in the container;
determining and recording a sensor output, $V_{L/Eair}$, with the circuit in the level/empty configuration and the sensor in air;
determining and recording a sensor output, $V_{C/Eair}$, with the circuit in the condition (reference)/empty configuration and the sensor in air;
determining and recording a sensor output, $V_{L/Etest}$, with the circuit in the level/empty configuration and the sensor in a test fluid;
determining and recording a sensor output, $V_{C/Etest}$, with the circuit in the condition (reference)/empty configuration and the sensor in the test fluid;
determining and recording a sensor output, $V_{L/Eoil}$, with the circuit in the level/empty configuration and the sensor in a subject fluid;
determining and recording a sensor output, $V_{C/Eoil}$, with the circuit in the condition (reference)/empty configuration and the sensor in the subject fluid; and
based on the sensor outputs, determining the level of fluid in a container.

2. The method of claim 1, further comprising the acts of:
inputting to the circuit a shaped voltage signal; and
inputting to the circuit an inverted shaped voltage signal.

3. The method of claim 1, further comprising the act of:
providing a signal to a gauge that continuously displays the subject fluid level.

4. The method of claim 1, further comprising the act of:
providing a signal to a warning light that is illuminated when the subject fluid level falls below a predetermined level.

5. A method for determining fluid level comprising the acts of:
placing one and only one sensor in a fluid;
configuring a sensor circuit to a level/empty configuration;
inputting at least two signals to the circuit;
receiving a first sensor output;
configuring the circuit to a condition (reference)/empty configuration;
inputting at least two signals to the circuit;
receiving a second sensor output; and
outputting a signal representative of fluid level in the container, based on the first and second outputs.

6. The method of claim 5 wherein the sensor is calibrated by the acts of:

placing the sensor in air;

configuring the circuit to the level/empty configuration;

inputting at least two signals to the circuit;

receiving a sensor output, $V_{L/Eair}$;

configuring the circuit to the condition (reference)/empty configuration;

inputting at least two signals to the circuit;

receiving a sensor output, $V_{C/Eair}$; and based on the sensor outputs, $V_{L/Eair}$ and $V_{C/Eair}$, determining an empty check capacitance of the sensor.

7. The method of claim 6, further comprising the acts of:

placing the sensor in a test fluid;

configuring the circuit to the level/empty configuration;

inputting at least two signals to the circuit;

receiving a sensor output, $V_{L/Etest}$;

configuring the circuit to the condition (reference)/empty configuration;

inputting at least two signals to the circuit;

receiving a sensor output, $V_{C/Etest}$;

based on the sensor outputs, $V_{L/Etest}$ and $V_{C/Etest}$ and the empty check capacitance, calibrating the sensor.

8. The method of claim 7, wherein at least one signal is a triangular signal and at least one signal is an inverted triangular signal.

9. The method of claim 7, further comprising the act of:

providing a signal to a gauge that continuously displays the fluid level.

10. The method of claim 7, further comprising the act of:

providing a signal to a warning light that is illuminated when the fluid level falls below a predetermined level.

11. A method for sensing fluid level, comprising:

disposing at least one level sensing structure in a container holding the fluid, the structure defining at least a portion of an electrical circuit, the sensing structure including a receiver tube, a level tube coaxially disposed in the receiver tube, and a reference tube coaxially disposed in the receiver tube below the level tube relative to the upright orientation; and inputting a waveform and an inverse waveform to the circuit.

12. The method of claim 11, wherein the waveform is triangular.

* * * * *